O. L. INGRAM.
DEMOUNTABLE RIM.
APPLICATION FILED DEC. 26, 1918.

1,343,394.

Patented June 15, 1920.

Inventor:
Oscar L. Ingram

O. L. INGRAM.
DEMOUNTABLE RIM.
APPLICATION FILED DEC. 26, 1918.
1,343,394.
Patented June 15, 1920.
2 SHEETS—SHEET 2.
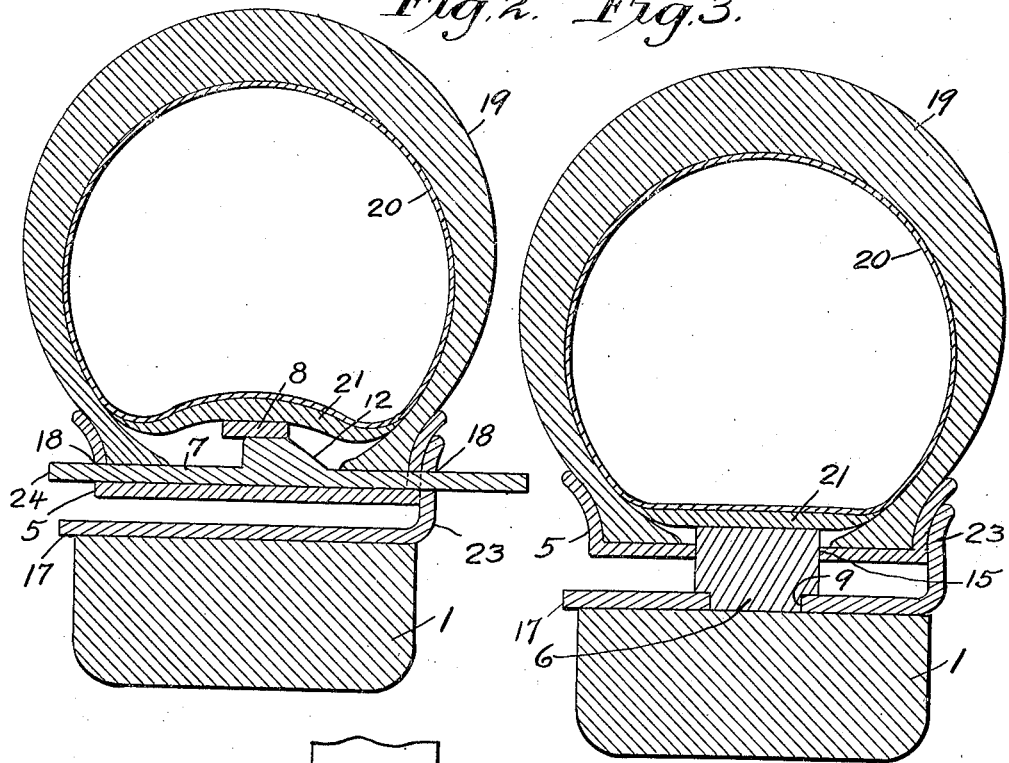
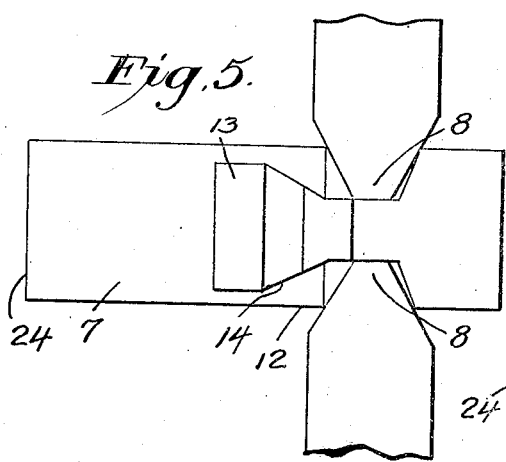
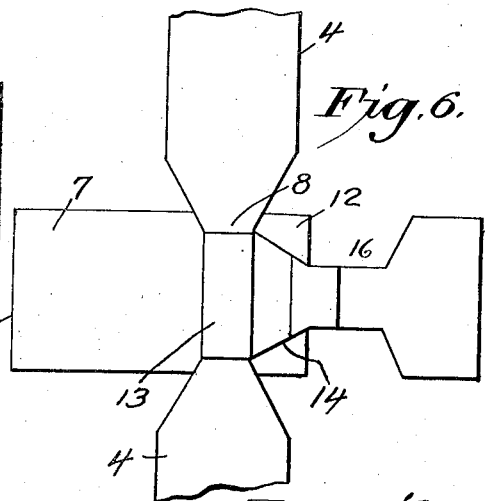
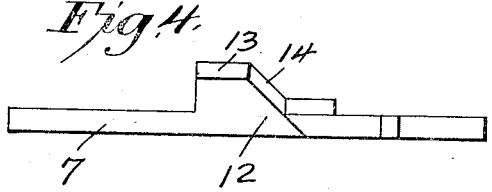
Inventor.
Oscar L. Ingram

UNITED STATES PATENT OFFICE.

OSCAR L. INGRAM, OF WALLA WALLA, WASHINGTON.

DEMOUNTABLE RIM.

1,343,394.  Specification of Letters Patent.  Patented June 15, 1920.

Application filed December 26, 1918. Serial No. 268,410.

*To all whom it may concern:*

Be it known that I, OSCAR L. INGRAM, a citizen of the United States, residing at Walla Walla, in the county of Walla Walla and State of Washington, have invented a new and useful Improvement in Demountable Rims, of which the following is a specification.

My invention relates more particularly to that sort of demountable rim usually made use of on automobile wheels, in which it is desirable to provide a rim that can be easily and readily removed from the wheel and as easily and readily replaced on the wheel. The chief objects of my invention are to provide a rim that can be removed or replaced quickly and easily, with the application of little effort and the use of few tools, as well as one that will be firmly held on the wheel when in use.

I attain these ends by means of the parts and manner of construction illustrated in the following and accompanying drawings, in which—

Fig. 2 is a cross sectional view of the felly of a wheel carrying my rim, and an ordinary automobile tire, with inner tube, etc. This view shows in section a key-piece (7) by means of which the rim is released from the wheel.

Fig. 3 is also a cross section of a felly carrying my rim and shows in cross-section the locking blocks 6 by means of which the rim is locked on the wheel.

Fig. 4 is a profile view of the key-piece 7, and is intended to show certain camming surfaces on said piece.

Figure 1:
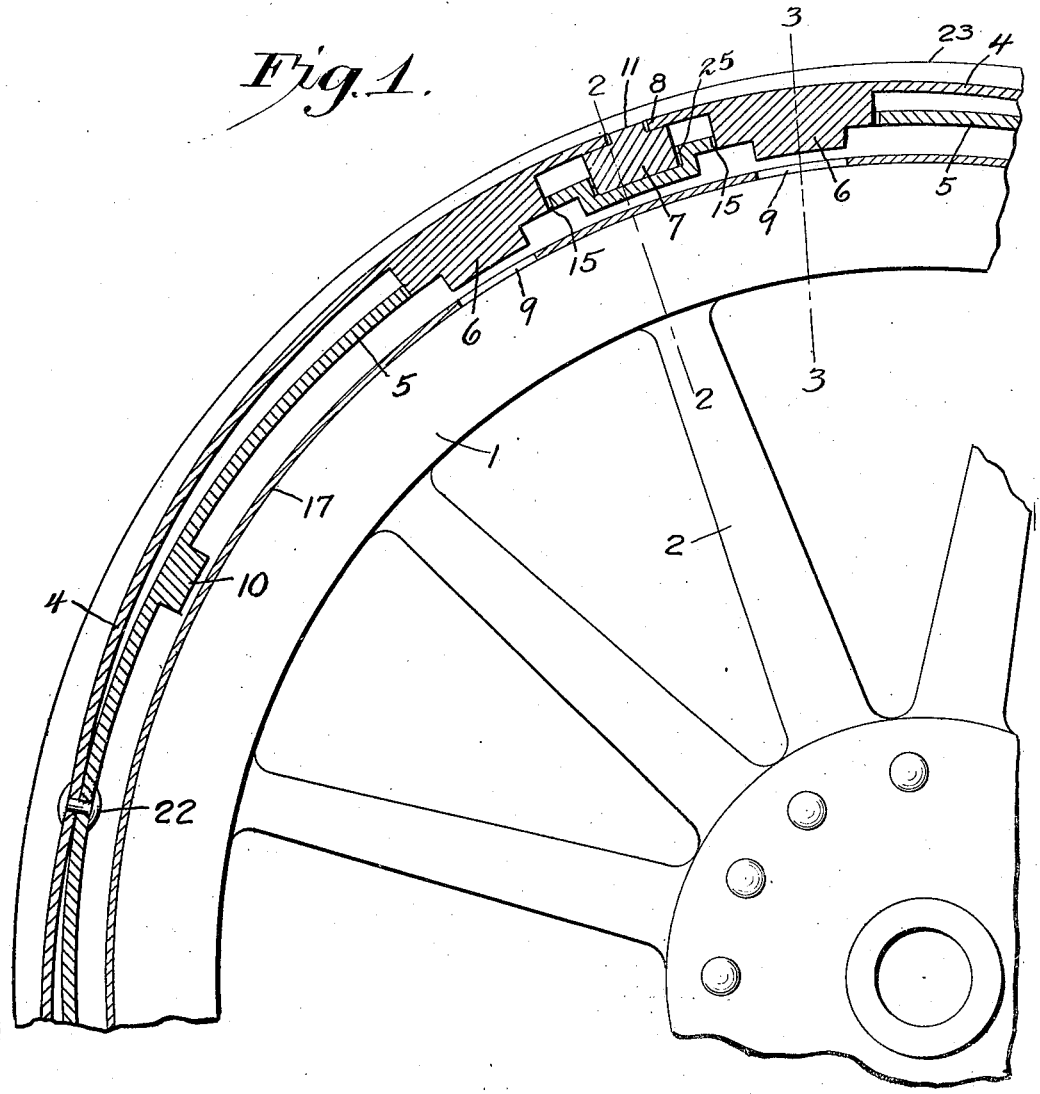
Figure 1 is a fragmentary side elevation partly in section of an ordinary automobile wheel carrying my rim, in which view the wheel is in profile and the parts of the rim shown are in section and profile. This view particularly illustrates the manner in which the rim is locked on the wheel.

Fig. 5 is a top view of the key-piece 7, and a top view of the pointed ends of circular spring pieces 4, which spring pieces 4, carry the blocks 6.

Fig. 6 is a view showing the same parts illustrated in Fig. 5, but showing them in a different position relative to each other.

Similar letters and numerals refer to similar parts throughout the several views.

While in the usual method of construction the rim is held on the wheel by means of various sorts of bolts and wedges which are at times very difficult to operate properly, in my invention the pressure in the inflated tire is utilized to so exert pressure on certain parts of my device as to securely lock the rim on the wheel when the tire is inflated, and yet facilitate its easy removal when the tire is deflated. To accomplish this I provide, as clearly shown in Fig. 1, the spring pieces 4, carried by the rim and attached thereto by the rivets 22, or other suitable means, which pieces 4 have projecting blocks 6, which may be formed as an integral part of the pieces 4, or may be attached thereto. These blocks 6 project inward through holes in the rim, and are adapted to engage pocket holes in the usual steel band carried by the felly of the wheel. By reference to Figs. 1, 2 and 3 it will readily be observed that the air pressure in the inner tube 20 will operate to push the pieces 4 inward and thus cause the blocks 6 to move inward into the pocket holes 9 in the steel felly band 17. (See Figs. 2 and 3.) The manner in which the key-piece 7 is moved to permit the air pressure to thus operate will be explained hereafter, but it may be well to say here that the movement of this key-piece in one direction lifts the pieces 4 upward or outward disengaging the blocks 6 from the holes 9 and when moved in the opposite direction permits the pressure in the tire to push the pieces 4 inward as mentioned above. In my construction I have used six of the pieces 4, made in pairs of two, and have made them of spring steel, for reasons hereinafter mentioned, but I do not wish to limit myself to the number used, nor the sort of material from which they are made. In my drawing (Fig. 1) I have deemed it necessary to only show so much of a wheel as would illustrate the manner in which any two of the pieces 4 operate, especially in connection with each other, it being understood that no matter how many pieces 4 were carried by a rim they would operate substantially in the same manner.

Now having explained briefly the general construction and manner of operation of my rim, I will proceed to a more detailed description of the same.

By reference to the part marked 5 in Fig. 2 and in Fig. 3 it will be seen that in my construction a rim, to a large extent, of the ordinary shape may be used, but through this rim, at the proper intervals, are the holes 15, (Figs. 1 and 3), and around the periphery of the rim are placed the circular shaped pieces 4, (Fig. 1). Each of the circular shaped pieces 4 carries a block 6, (Figs. 1 and 3), which projects through a corresponding hole 15 in the rim. Now, by reference to Fig. 3 it will readily be seen that the compressed air in the inner tube 20, carried by the tire or casing 19, will exert a considerable pressure against the tongue or protecting strip 21, (Fig. 3) which pressure will be transmitted to the parts 4, and will tend to press them toward the center of the wheel, thus causing the blocks 6 to engage the holes 9, in the usual felly band of the wheel, as is clearly shown in Fig. 1 and also in Fig. 3. In Fig. 1 the stud 6 is resting just above the hole 9 while in Fig. 3 the block has engaged the hole 9 by reason of the pressure of the air in the tube 20. Even in the smaller automobile tires this air pressure would be several hundred pounds, and it will thus be readily understood that my rim is securely and firmly locked on the wheel by this pressure. Now, it will at once become evident that it is necessary to provide a means for permitting the easy removal of the rim from the wheel when necessary. To accomplish this I provide the key-piece 7, as shown in Figs. 4 and 5, and I will describe the manner in which a slight movement of this key piece 7 in one direction allows the air pressure to operate the pieces 4 to lock the rim on the wheel, while its movement in the opposite direction will so operate the pieces 4 as to allow the easy and rapid removal of the rim from the wheel. Now, having briefly mentioned the various parts of my rim, and having briefly referred to the manner in which said parts function, I will more fully describe in detail one complete operation of placing my rim, carrying an automobile tire, on a wheel and removing it therefrom. I will start with the assumption that the rim is not on the wheel, and there is no air in the tire carried by the rim, that is to say no compressed air, or in other words we will suppose the tire is "deflated," it being then necessary to inflate the tire and at some future time place it on the wheel, or rather place the rim carrying the tire, on a wheel. In this event the operation will be as follows:

The first operation is to strike with a hammer or other convenient tool the end (marked 24) of the key-piece 7. Special reference will be had now to Fig. 2, the key-piece 7 in said Fig. 2 being in the position it will take after being struck as aforesaid. Only a slight blow is necessary at the point marked 24 to cause a sliding movement of the key-piece 7, and the pointed ends 8 of the pieces 4, (Figs. 2 and 6) would ride up the inclined surfaces 12 of the key-piece 7, and the ends 8 of the pieces 4 will be moved (in a sort of a spreading movement spreading them farther apart) by the camming surfaces 14. (See Figs. 5 and 6). These two camming movements will cause the pieces 4 to take the position shown in Figs. 1 and 2, and the blocks 6 will be disengaged from the holes 9 in the felly band of the wheel, and the parts will be firmly held in this position by means of the key-piece 7, as is clearly shown in Figs. 1 and 6. Now, and not until now, the rim is in a condition to have its tire inflated. In order to prevent the usual inner tube 20 from being pinched or otherwise damaged by the spring pieces 4 I use the ordinary tongue or protecting strip 21, as is clearly shown in Figs. 2 and 3. It may be advisable to use a little heavier protecting strip or tongue than is usually employed in the ordinary rim. Now, having inflated the tire the rim is ready to be placed on the wheel at any time it becomes necessary, and in order to do this all that is necessary is to slip it on the wheel and strike the end of the key-piece 7 with any suitable tool, (see Fig. 6) whereupon the key-piece 7 will slide to the position shown in Fig. 5, and the pieces 4 will assume the position they are shown in in Figs. 3 and 5. This movement will be readily understood when it is remembered that there is a very heavy pressure being exerted on the pieces 4 by the compressed air in the tire, which pressure, as soon as the key-piece 7 is moved as above described, causes the said pieces 4 to move inward toward the center of the wheel in a sort of a collapsing movement, and the blocks 6 will enter the holes 9 as shown in Fig. 3, and the pressure of the air will hold the parts securely in this position, and the rim will thereby be firmly secured to the wheel. It might be well to state here that the holes 9 are somewhat elongated as shown in Fig. 1 to permit the more readily the entrance of the blocks 6. It will thus be seen that all that is necessary in order to place my rim on a wheel is to slip it on and strike the end of the key-piece 7 with most any sort of convenient tool, even a rock sufficing. Now we will assume it has become necessary, because of a punctured tire or for some other reason, to remove the rim from the wheel, in which event the operation would be as follows:

If the tire had not by some accidental means been deflated it would first be necessary to let the compressed air out of the tire, inasmuch as it would be impossible to operate the key-piece 7 as hereinafter to be described, if it were compelled to operate against the pressure in an inflated tire. Now, having deflated the tire, the only other necessary operation would be to strike the key piece 7 on the end marked 24, which would cause it to assume the position shown clearly in Figs. 2 and 6, and the spring pieces 4 would be moved to the position shown in Figs. 1, 2 and 6, thus causing the blocks 6 to be disengaged from the holes 9, as shown in Fig. 1, and the rim could then easily be slipped off of the wheel as is readily apparent by reference to Fig. 1.

In order to the more perfectly center the rim with reference to the wheel I use the ordinary lugs 10 (Fig. 1) such as are now used on the ordinary demountable rim for the same purpose, but any other suitable means may be employed for this purpose. In case the lugs 10 are used of course any desired number may be employed.

Now, having stated that my rim is held in place by means of the compressed air in the tire, it might be suggested that there are times when it becomes necessary to retain the rim on the wheel, at least for short periods of time, when there is no compressed air in the tire, for instance immediately after an accidental puncture of the tire. To attain this end I have provided the spring pieces 4, with a strong spring tendency inward, and they will thus hold the blocks 6 in the holes 9 even after the air has escaped from the tire in case of a puncture and before the rim can be removed from the wheel the key piece 7 must be moved as above described.

By reference to Fig. 1 it will be seen that in the rim 5, I have provided a sort of a recess or pocket 25 in which the key-piece 7 rests. The purpose of this is to prevent the key-piece from interfering too much with the casing as it lies in the rim which might otherwise cause it to have too little gripping surface at the place where the key-piece 7 passes under it and through the rim. This is shown clearly in Fig. 1, and is to an extent shown in Fig. 2 by comparing the sectional view there shown with the sectional view shown in Fig. 3, as it will be seen by reference to these two figures that in each the tire has about the same gripping surface on the flange of the rim. While I have in this specification defined a felly band, in the claims I have used the term "wheel body," because broadly defining the part to which the rim is attached.

Now, having fully described my invention, what I claim as new and desire to secure by Letters Patent, is:

1. The combination of an inflatable tire, a wheel body and a rim, the rim carrying arms adapted to engage, and to be held by, the wheel body through the pressure of the air in the tire.

2. In a wheel, the combination of an inflatable tire, a wheel body having pockets, a rim having holes, blocks adapted to pass through the holes of the rim and enter the pockets of the wheel body to secure the rim to the wheel body by the pressure of the air in the tire upon the blocks.

3. In a wheel, the combination of a wheel body having holes and a rim having holes adapted to register with the holes in the wheel body, arms secured to the rim, the arms carrying blocks adapted to pass through the holes in the rim and enter the holes in the wheel body, and key pieces adapted to release the blocks from the holes when moved in one direction, and adapted to permit the entrance of the blocks into the holes when moved in the opposite direction.

4. A demountable rim for a wheel and an inflatable tire, the rim being so shaped that it will receive and retain the tire; spring pieces carried by the rim, blocks carried by the spring pieces and projecting through the rim, key-pieces movable to permit a movement of the spring pieces in one direction, and movable to cause their movement in another direction.

5. The combination of a demountable rim and inflatable tire, the rim being so shaped that it will receive and retain the tire, locking pieces carried by the rim for the purpose of locking the rim on a wheel, key pieces slidably movable to one position to permit the locking pieces to move to locking positions and slidably movable to another position to cause the locking pieces to move to unlocking positions, the various parts being so related and arranged that the air pressure in the tire will function to hold the locking pieces in locking positions after they have moved to locking positions.

6. In combination an inflatable tire comprising an outer casing and an inner tube; a demountable rim comprising a main member adapted to receive and retain the casing, locking members carried by the main member and movable relative thereto adapted to lock the main member on a wheel by a movement substantially toward the center of the wheel; the locking members being so arranged that the pressure of the air in the tire will function to move them to locking positions, key pieces adapted to hold the locking members in unlocking position, but movable to permit the locking members to move to locking positions.

7. A demountable rim comprising a main member adapted to receive and carry an inflatable tire, locking pieces carried by the main member adapted to lock the main member on a wheel, the locking pieces being movable by a spring and also by the pressure of the air in the tire, to locking positions, key pieces to retain the locking pieces in unlocking positions when the rim is not on a wheel, and movable to permit the locking pieces to move to locking positions when the rim is on the wheel.

8. A demountable rim for a wheel and inflatable tire; the rim being so shaped that it will receive and retain the tire, locking members carried by the rim for locking the rim on the wheel, the locking pieces being firmly secured to the rim at one place and being substantially immovable relative to the rim where they are so secured, but movable relative to the rim at another place to lock or unlock the rim relative to the wheel, key pieces adapted to cause an unlocking movement of the locking members when moved in one direction and adapted to permit the locking members to move to locking positions when moved in another direction, the parts being so related and arranged that the air pressure in the tire, when inflated, will exert a continuous pressure against the locking members to retain them in locking positions.

9. The combination of a demountable rim for a wheel and an inflatable tire, the rim being adapted to receive and retain the tire, a curved arm carried by the rim adapted to move into engagement with and be held by the wheel-body, the parts being so related and arranged that the air in the tire when inflated will exert a contiuous pressure on the curved arm to hold it in engagement with the wheel-body.

10. The combination of a demountable rim for a wheel and an inflatable tire, the rim being adapted to receive and support the tire, a curved arm carried by the rim, and adapted to move into engagement with and be held by the wheel-body, a key piece adapted to normally retain the arm out of engagement with the wheel-body, but movable to permit the arm to engage the wheel-body, the parts being so related and arranged that the pressure of the air in the tire will function to hold the arm in engagement with the wheel-body after the key piece has been moved to permit such engagement.

OSCAR L. INGRAM.